United States Patent [19]

Beutler et al.

[11] 4,101,274

[45] Jul. 18, 1978

[54] PROCESS FOR THE LEVEL DYEING OF SYNTHETIC FIBER MATERIALS

[75] Inventors: Helmut Beutler, Kerlkheim, Taunus; Friedrich Engelhardt, Frankfurt am Main; Karl Hintermeier, Frankfurt am Main; Joachim Ribka, Offenbach am Main, all of Fed. Rep. of Germany

[73] Assignee: Hoechst Aktiengesellschaft, Frankfurt am Main, Fed. Rep. of Germany

[21] Appl. No.: 660,831

[22] Filed: Feb. 24, 1976

[30] Foreign Application Priority Data

Feb. 27, 1975 [DE] Fed. Rep. of Germany ....... 2508472

[51] Int. Cl.$^2$ .............................................. D06P 5/04
[52] U.S. Cl. ....................................... 8/173; 8/168 C; 528/272; 560/84; 560/85; 560/89; 560/91
[58] Field of Search .............. 8/173, 168 C; 260/75 S, 260/440, 481 R

[56] References Cited

U.S. PATENT DOCUMENTS

| T862,017 | 5/1969 | Caldwell | 260/75 S |
|---|---|---|---|
| 2,028,091 | 1/1936 | Jaeger | 260/481 |
| 2,176,423 | 10/1939 | Jaeger | 260/481 |
| 2,923,593 | 2/1960 | Olpin et al. | 8/173 |
| 3,734,874 | 5/1973 | Kibler et al. | 260/75 S |
| 3,978,262 | 8/1976 | Fritz et al. | 260/75 S |

*Primary Examiner*—William E. Schulz
*Attorney, Agent, or Firm*—Connolly and Hutz

[57] ABSTRACT

Process for the even dyeing of synthetic fiber materials and mixtures thereof with natural fibers with water-insoluble disperse dyes according to the exhaustion method, which comprises adding to the dyebath as levelling agents linear water-soluble, or dispersible polyesters containing sulfo groups.

17 Claims, No Drawings

PROCESS FOR THE LEVEL DYEING OF SYNTHETIC FIBER MATERIALS

The present invention relates to a process for the level dyeing of synthetic fiber materials.

For dyeing synthetic fibers, preferably fibers made of linear polyesters, exhaustion methods from aqueous liquors with disperse dyes have been known for a long time.

In principle, there are two different methods of dyeing with these dyestuffs: In the first one, dyeing is carried out at the boiling temperature. Since the affinity of the dyestuff to the fiber is still unsufficient in this case, so-called dyeing accelerators (carriers) must be used to improve the affinity in order to obtain dyeings of high color intensity (tinctorial strength) within a reasonable period of dyeing.

In the second dyeing method, the temperature is raised beyond the boiling point of the water, generally 110°–130° C, which promotes the diffusion of the dyestuff into the fiber without the use of the carrier substances mentioned above to improve the affinity.

All these methods have the disadvantage that they are most likely to produce uneven dyeings due to the difference of temperature in the bath, to sudden rises of the temperature when the dyebaths are heated, to differences in the flow intensity of the dyeliquors through the dyeing goods, to the irregular density of the packed material and to differences in the structure of the synthetic textile fibers.

But, above all, it is the different affinity of the dyestuffs employed in combination dyeings that makes the dyeings uneven.

Attempts have been made to overcome these difficulties by an exact control of the temperature, by special dyeing methods and by the addition of special auxiliaries. The failure of these attempts was due to the different behaviour of the individual dyestuffs. For this reason, some of the dyestuffs could not be used in certain fields of application, for example, in the wound package dyeing.

The products used until now to obtain even dyeings are carriers, or levelling carriers, respectively levelling agents having a carrier effect or levelling agents. But these products can affect the fastness properties, especially the fastness to light, or they act as a retarding agent. The dyestuff yields obtained are then incomplete. The penetration of the material by the dyestuff is unsatisfactory. Moreover, all these products contribute to the crystallization tendency of disperse dyes and so cause faulty dyeings when the dyebath cools unexpectedly or the temperature vacillates.

Now, it was found that even dyeings can be obtained on all sorts of synthetic fibers, under unfavorable dyeing conditions as well as with the use of dyeing goods yielding unlevel dyeings, with water-insoluble disperse dyes according to the exhaustion method, when beside the dyestuff and the substances adjusting the pH, water-soluble or dispersible linear polyesters containing sulfo groups and having a molecular weight of 800–5,000, preferably 1,000–3,000 are added to the dyeing liquors in amounts of 0.1–5 g/l, preferably 0.5–2 g/l.

The water-soluble, linear polyesters according to the invention are obtained in known manner (cf., for example German Offenlegungsschrift No. 1,816,163) by polycondensation of dicarboxylic acids (or their esters, anhydrides or acid halides) with bis-alcohols or bis-phenols, in which case 5–30 mole % of the dicarboxylic acids or bishydroxy compounds must carry sulfo groups or their salts. It does not matter how the chain members carrying sulfo groups are distributed between the dicarboxylic acids and the bishydroxy compounds. Instead of dicarboxylic acids and bishydroxy compounds an aliquote proportion may be replaced by hydroxycarboxylic acids.

The dicarboxylic acids are saturated and unsaturated, aliphatic, cycloaliphatic and aromatic dicarboxylic acids, preferably those having 4–10 carbon atoms, and among these preferably the benzene dicarboxylic acids, for example, succinic acid, glutaric acid, adipic acid, suberic acid, maleic acid, itaconic acid, cyclohexane dicarboxylic acid-1,4, phthalic acid, isophthalic acid, terephthalic acid, the naphthalenedicarboxylic acids and others, but also the esters, anhydrides and acid halides thereof. The dicarboxylic acids may be used alone or, advantageously, in the form of their mixtures.

The bisalcohols for the linear polycondensates to be used according to the invention are also saturated and unsaturated aliphatic, cycloaliphatic and aromatic compounds, preferably those having 2–10 carbon atoms, above all those having ether bridges. In the latter case, however, the preferred number of 2–10 carbon atoms indicated above is only considered for the member between the two ether bridges or oxygen atoms.

There may be mentioned, for example, ethylene glycol, propanediol -1,2, propanediol-1,3, the butane diols, above all butanediol-1,4, butenediol-1,4, hexanediol-1,6, decanediol-1,10, 2-methylenepropanediol-1,3, 1,3-dihydroxy-cyclohexane, 1,4-dihydroxy-cyclohexane, 1,4-bis-hydroxy-methyl-cyclohexane, 1,4-bishydroxymethyl-benzene, 2,6-bishydroxymethyl-naphthalene, diethylene glycol, triethylene glycol, polyethylene glycols of an average molecular weight 200–6,000, dipropylene glycol, polypropylene glycols, bis-(4-hydroxybutyl)-ether, and others.

The bisalcohols can be used alone or, preferably, in the form of their mixtures.

A preferred diol component is the diethylene glycol. Preferred mixtures contain from 0–95 mole %. Diethylene glycol and 5–40 mole % bisalcohols having more than two ether bridges, especially advantageous are 5–20 mole % polyethylene glycols of an average molecular weight of 300–1,000.

Suitable hydroxycarboxylic acids for the preparation of the linear polyesters to be used according to the invention contain, preferably, 2–11 carbon atoms, for example, glycolic acid, 3-hyroxypropionic acid, 4-hydroxybutyric acid, 5-hydroxy-pentene-(3)-acids, 3-hydroxymethyl-cyclohexane-carboxylic acid, 4-hydroxymethyl-cyclohexanecarboxylic acid, 4-hydroxybenzoic acid, 6-hydroxydecaline-carboxylic acid-(2), and others. If hydroxycarboxylic acids are used, preferably 40 mole % at maximum of the content of dicarboxylic acids and diols are replaced by hydroxycarboxylic acids.

Compounds carrying the sulfo groups may be aliphatic, cycloaliphatic and aromatic compounds. The frame carrying the sulfo groups may be a dicarboxylic acid, a bisalcohol or a bisphenol. The water-solubilizing sulfo groups may also be introduced into the polyesters afterwards, for example, as described in German Offenlegungsschrift No. 2,335,480, by reacting polyesters having double bonds with bisulfite.

Dicarboxylic acids or the preferred esters thereof carrying sulfo groups are, for example:

| | |
|---|---|
| sodium-sulfosuccinic acid-dimethyl ester | 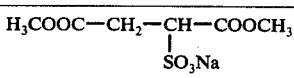 |
| sodium-5-sulfoisophthalic acid-dimethyl ester | 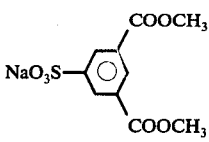 |
| 5-sulfopropoxy-isophthalic acid-dimethyl ester (sodium salt) | 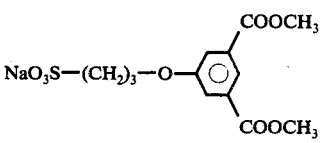 |

Bisalcohols and bisphenols carrying sulfo groups, are for example:

| | |
|---|---|
| 2-(sodium-sulfonatomethyl)-propanediol.1,3 (cf. German Offenlegungsschrift No. 2,224,255) | 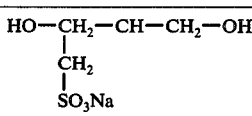 |
| 2,7-dihydroxy-naphthalene-3,6-disulfonic acid (disodium salt) (EGA standard) | 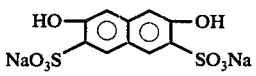 |
| 1,8-dihydroxy-naphthalene-3,6-disulfonic acid (disodium salt) | 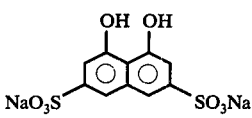 |

Hydroxycarboxylic acids carrying sulfo groups are, for example:

| | |
|---|---|
| 5-sulfosalicylic acid (sodium salt) | 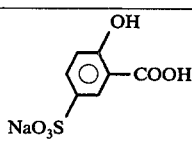 |
| 3-hydroxy-5-sodiumsulfonatobenzoic acid methyl ester | 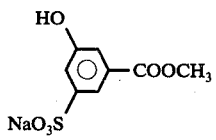 |

Products of the general formula

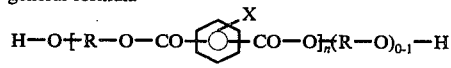

in which

X = —H, —O—CH$_2$—CH$_2$—CH$_2$—SO$_3$M or —SO$_3$M

M = —H, alkali metal, ammonium,

R = a bisalcohol radical (cf. list pages 4 and 5) and n = is such that the average molecular weight of the polyester is within the range of 800 and 5,000, are preferred.

Especially preferred are water-soluble polyesters in which 10–20 mole % of the phenylene radicals are obtained by condensing 5-sodiumsulfonatopropoxy-isophthalic acid-dimethyl ester or 5-sodiumsulfonato-isophthalic acid-dimethyl ester.

40–90 mole % by condensing acid or their derivatives, and

0–40 moles % by condensing terephthalic acid, preferably in the form of the dimethyl ester, and 0–95 mole % of the bisalcohol used is diethylene glycol and 5–40 mole % of the bisalcohol used are one or several other diols, preferably polyethylene glycols of an average molecular weight of 300–1,000.

The above general formula may be varied such that 0–40 mole % of the total proportion of benzenedicarboxylic acids in this formula are replaced by an aliphatic or cycloaliphatic dicarboxylic acid of 4–10 carbon atoms.

The apparent average molecular weight is determined in the vapor pressure osmometer in dimethyl formamide used as solvent. Because of the dissociation of the sulfonato groups, the real average molecular weight is higher than the apparent rate as measured. But this rate is precise enough to characterize the degree of condensation of the mixed polyester according to the invention and to determine the end product of the condensation.

The following Examples serve to illustrate the invention, more specifically the structure of the polyesters containing sulfo groups as used in this invention. Mole % indicates, generally in this invention if not stated otherwise, for dicarboxylic acids only the total proportion of the dicarboxylic acid, for bishydroxy compounds only the theoretical total content of diols, corresponding to the sum of all carboxylic acids. The abbreviations are:

IPA for isophthalic acid
DMT for terephthalic acid dimethyl ester
BA for succinic acid anhydride
SIM for 5-sodiumsulfonato-isophthalic acid dimethyl ester
SPO for 5-sodiumsulfonatopropoxy-isophthalic acid dimethyl ester
DEG for diethylene glycol
TEG for triethylene glycol
DPG for dipropylene glycol
MG for apparent molecular weight

EXAMPLE 1

Prepared from 85 mole % IPA; 15 mole % SPO and 110 mole % DEG.

In a four-neck flask with ground stopper provided with stirrer, thermometer, gas inlet tube and descending cooler 291.5 g of DEG (= 2.75 moles), 352 g of isophthalic acid of a 99% degree of purity (= 2.125 moles) and 132.5 g of SPO (= 0.375 mole) and 3 g of titanium isopropylate were thoroughly mixed while being superposed with an atmosphere of nitrogen. Under a weak carbon dioxide stream, the reaction mixture was heated to 150° C during an hour, then the temperature was brought to 190° C in the course of 3 hours. In the course of a further 3 hours the temperature was raised to 220°–225° C and the mixture was allowed to stand at that temperature for 2 hours. Then, a vacuum of about 12 mm was established, the temperature was kept at 220°–225° C for a further 5 hours and finally the temperature was raised to 230°–240° C under a vacuum of 12 mm for 2 hours. About 664 g of an amber-colored residue were obtained. A 30% limpid solution of that polyester in water has a pH-value of about 5.9, which can be raised to 6.5-6.8 with the addition of 1-2 ml of 25% sodium hydroxide solution. The average molecular weight of this product was 1,500-1,600.

EXAMPLE 2

Prepared from 80 mole % of IPA; 20 mole % of SIM; 90 mole % of DEG and 20 mole % of TEG.

Similar results were obtained when in Example 1 instead of 352 g of IPA only 332 g of IPA (= 2 mols), instead of SPO 148 g of SIM (= 0.5 mole), instead of 291.5 g of DEG only 238.5 g of DEG (= 2.25 moles) and additionally 75 g of TEG (= 0.5 mole) were used. The process itself was the same as in Example 1. The molecular weight was 1,300-1,500.

EXAMPLE 3

Prepared from 60 mole % of IPA; 25 mole % of DMT; 5 mole % of SIM; 10 mole % of SPO; 120 mole % of DEG; molecular weight: 1,400-1,600.

Similar results were obtained when in Example 1 instead of 352 g of IPA only 249 g of IPA (1.5 moles) and 121.25 g of DMT (= 0.625 mole), instead of 132.5 g of SPO only 88.5 g of SPO (= 0.25 mole) and 37 g of SIM (= 0.125 mole), and instead of 291.5 g of DEG 318 g of DEG (= 3 moles) were used. The process itself was the same as described in Example 1.

EXAMPLE 4

Prepared from 45 mole % of IPA; 40 mole % of DMT; 15 mole % of SPO; 110 mole % of DEG.

In a four-neck flask with ground stopper provided with stirrer, thermometer, gas inlet tube and descending cooler, 291,5 g of DEG (= 2.75 moles), 132.5 g of SPO (= 0.375 moles) 194 g of DMT (= 1 mole) and 1 g of titanium isopropylate were heated to 150° C while superposing with an atmosphere of nitrogen and the temperature was raised first to 165° C during 2 hours, then to 190° C during another 3 hours, whereupon about 80 g of methanol were distilled off. The mixture in the flask was cooled to 140°-150° C and 186.75 g of isophthalic acid (= 1.125 moles) of a degree of purity of 99% were introduced while stirring. The mixture was heated first for 3 hours to 220°-225° C while nitrogen was passed over again. There was again a distillate of about 40 g (mostly water). Then, a vacuum of 12 mm was established and heating to 220°-225° C followed during 5 hours while thoroughly stirring, whereupon a small amount of excess diethylene glycol was distilled off. There was a yield of 650-655 g of amber-colored, viscous residue which solidified when cooling to a solid, dry, clear resin which was easy to comminute and to dissolve in water while remaining practically clear. The pH-value of a 30% aqueous solution was 6.5-6.8. The product had an average molecular weight of 1.400-1,500.

When the mixture was heated while connected on the water jet pump for less than 5 hours, or at lower temperatures or when the vacuum was of less strength, a polycondensate of a lower molecular weight was obtained.

When the mixture was heated while connected on the water jet pump for more than 5 hours or at elevated temperatures and/or under a vacuum of high strength, a polycondensate of a higher molecular weight was obtained.

The suitable choice of the reaction conditions allows to obtain any average molecular weight in reproducible manner.

EXAMPLE 5

Prepared from 50 mole % of IPA; 40 mole % of DMT; 10 mole % of SPO; 90 + 10 mole % of DEG; 10 mole % of polyethylene of the molecular weight 600.

In a four-neck flask with ground stopper and provided as described in Example 1, 207.5 g of IPA (= 1.25 moles), 194 g of DMT (= 1 mole), 88.5 g of SPO (= 0.25 mole), 239 g of diethylene glycol (= 2.25 moles), 150 g of polyethylene glycol of the molecular weight 600 (= 0.25 mole), 4 g of titanium isopropylate and 6 g of sodium methylate were heated to 165° C for 2 hours on the descending cooler and the temperature was raised to 190° C in the course of 3 hours. The mixture was further heated to 220°- 225° C for 4 hours while superposed with an atmosphere of nitrogen, 26 g of DEG (= 0.25 mole) were added and heating to 220°-225° C for 4 hours was continued. During 3 hours and at the same temperature, the vacuum of a water-jet pump was established (about 12 mm mercury column) and then, for an hour, a vacuum of 0.5 mm was established. Methanol, water and excess diethylene glycol were distilled off in the course of the reaction, 750 g of amber-colored residue were obtained which could easily be diluted with 1570 g of water to 2,500 of a clear, viscous 30% solution. The pH-value of that aqueous solution was 6.5-7, the molecular weight was 2,500.

EXAMPLE 6

Prepared from 45 mole % of IPA; 40 mole % of DMT; 15 mole % of SPO; 60 mole % of DEG; 30 mole % of DPG; 20 mole % of polyethylene glycol of the molecular weight 400.

Similar results were obtained when in Example 5 instead of 2.5 moles of DEG and 0.25 mole of polyglycol of the molecular weight 600 only 1.5 moles of DEG were used, but additionally 0,75 mole of dipropylene glycol and 0,5 mole of polyethylene glycol of the average molecular weight 400. The process itself was the same.

EXAMPLE 7

Prepared from 45 mole % of IPA; 40 mole % of Ba; 15 mole % of SPO; 60 mole % of DEG; 40 mole % of ethylene glycol; 10 mole % of polyglycol of the molecular weight 1,000.

Similar results were obtained when in Example 5 instead of DMT an aliquote amount of succinic acid anhydride, instead of polyglycol of the molecular weight 600 an aliquote amount of polyglycol of the molecular weight 1,000 and instead of 2.5 moles of DEG only 1.5 moles of DEG were used, but additionally 1 mole of ethylene glycol was added. The process itself remained the same.

EXAMPLE 8

Prepared from 45 mole % of IPA; 40 mole % of cyclohexanedicarboxylic acid-1,4; 15 mole % of SIM; 110 mole % of DEG. Similar results were obtained when in Example 4 instead of DMT the aliquote amount of cyclohexanedicarboxylic acid-1,4 and instead of SPO the aliquote amount of SIM were used. The process itself remained the same.

In a similar way, which is now easily comprehensive for those skilled in the art, water-soluble, linear polyesters can also be prepared for the intended purpose of the invention. These polyesters have the following composition:

EXAMPLE 9

45 mole % of IPA; 40 mole % of DMT; 15 mole % of sodiumsulfato-succinic acid dimethyl ester; 100 mole % of DEG; 10 mole % of polyglycol of the molecular weight 300.

EXAMPLE 10

100 mole % of IPA; 20 mole % of 2-(sodiumsulfonatomethyl)-propanediol-1,3; 80 mole % of DEG; 10 mole % of polyethylene glycol of the molecular weight 2,000.

EXAMPLE 11

50 mole % of IPA; 50 mole % of BA; 15 mole % of 2,7-dihydroxy-naphthalene-disulfonic acid-(3,6) in the form of its disodium salt; 80 mole % of DEG; 10 mole % of TEG and 5 mole % of polyglycol of the molecular weight 400.

EXAMPLE 12

90 mole % of IPA; 20 mole % of 3-hydroxy-5-sodiumsulfonatobenzoic acid methyl ester; 90 mole % of DEG and 10 mole % of polyglycol of the molecular weight 1,000.

In a similar way, a great variety of products can be prepared within the scope of the patent claim of the invention and so the special properties of the products of the invention can excellently be fitted for the different types of fibers and tissues.

These water-soluble polyesters have become known sometimes as water-soluble, easily removable sizes.

The short-chain, water-soluble polyesters added to the dyebath according to the invention have a certain, partial carrier effect. Because the auxiliaries and the material to be dyed have chemical similarities, a reversible addition reaction is likely to take place between the disperse dye and the molecules of the auxiliaries which is shifted in favour of the final affinity of the dyestuff to the fiber.

This causes a very level and actually retarded absorption of the dyestuff by the fiber, a method which yields extraordinary level dyeings. Surprisingly, there is no dyestuff retention on the auxiliary and full color intensity is obtained. It is not necessary to prolong the period of dyeing.

It was also surprising that even insoluble dyestuffs having an insufficient finish could be used. So far, this was only possible within the scope of solvent dyeing, in apparatuses amd machines of special constructions. In this process, the optimum fine distribution necessary for dyeing was obtained, even when the dyeing liquor was heated over 100° C, and an extremely high stability of the dyeing liquors was achieved.

The detrimental tendency to crystallization often observed for disperse dyes is also prevented.

For these reasons, sedimentation of the dyestuff caused by turbulences in the machine and deposits on the material to be dyed do not take place.

All these facts together lead to an increase of the dyestuff yield which could not be foreseen. The difficulties mentioned could be avoided.

The auxiliaries to be used in accordance with the invention permit the use of the dyestuffs for example for dyeing wound packages in which field they could not be used before because of their individual behaviour. So, products of lower prices can be used in many cases and valuable new shades could be integrated in the palette of dyestuffs.

A further considerable advantage is given for the generally highly desirable high-speed dyeing processes.

The product provides for equal affinity curves of the disperse dyes used which means that combinations of three or even four dyestuffs can be used without consideration of the affinity phases of each of them. Although no slowing effect can be observed at high temperature dyeings and when dyeing at about 100° C the speed of affinity of the dyestuffs in high-speed dyeing processes is reduced. In these processes high amounts of dyestuff locally gather in the dyeing vessel at 130° C to be absorbed by the polyester fiber and this may produce unlevel dyeings. In this case, a reduced affinity speed of the dyestuff is advantageous because level dyeings are produced.

The dyebaths provided for dyeing are prepared as usual at 50°-60° C, pH-controlling substances are used to adjust the pH to 5-6 and amounts of 0.1-5 g/l of the suitable polyester are added. After adding the predispersed water-insoluble disperse dyestuff the mixture is heated to the dyeing temperature required and dyeing is carried out within the usual dyeing period. The dyeings are finished as usual, for example by purifying them afterwards reductively. The dyeings need not be treated afterwards with dry heat or by taking other measures to eliminate residual amounts of carrier substances because there remain none of the material and so, the fastness to light of the dyeing can also not be adversely affected.

In the high-speed dyeing processes the dyeing liquors are heated to the required dyeing temperature of 120°-130° C as usual with the addition of the amounts of auxiliaries according to the invention separately from the material to be dyed; they are quickly introduced into the dyeing machine containing the material to be dyed to bring them rapidly in contact with the fiber. The dyestuff is fixed in absolute levelness, different affinity properties of the dyestuffs are equalized by the auxiliary product. It is also possible to add the product as claimed according to the invention to the dyebath before the addition of the dyestuff dispersion.

The following Examples serve to illustrate the invention:

EXAMPLE 13

Wound packages ("muffs") made of texturized polyester yarns were streamed through on a high-temperature dyeing machine and at a goods-to-liquor ratio of 1 : 10, by a liquor of 130° C which consisted of soft water (pH 4.5 l adjusted with acetic acid) and 0.5 g of a linear, water-soluble polyester having the molecular weight 2,500 and prepared according to Example 5 by polycondensation from 50 mole % of isophthalic acid
40 mole % of dimethyl terephthalate
10 mole % of 5-sulfopropoxy-isophthalic acid dimethyl ester
100 mole % of diethylene glycol and
10 mole % of polyglycol of the molecular weight 600.

To this liquor was added quickly by means of an introduction equipment a mixture predispersed with water of 40° C and consisting of the following disperse dyes in commercial form:

0.46% of the dyestuff of the formula I

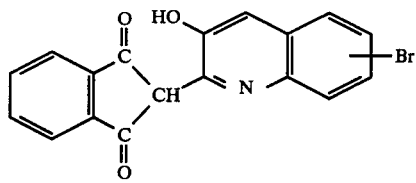

0.52% of the dyestuff of the formula II

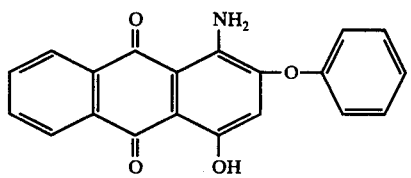

0.17% of the dyestuff of the formula III (equal parts)

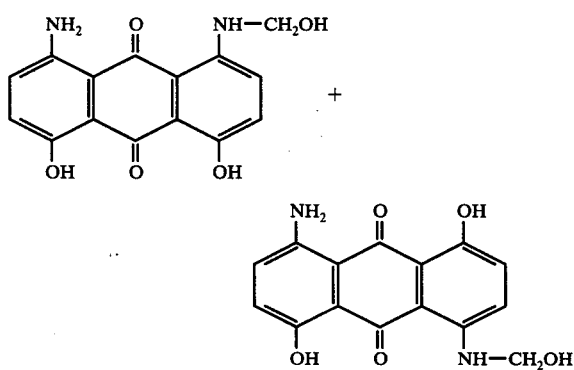

The through-put of the amount streaming through the wound package was 20 1/kg per minute. After a 30 minutes' treatment at 130° C cooling followed, the liquor was drained off and the dyeing was purified reductively.

A perfectly level brown dyeing was obtained in full dyestuff yield.

When the same dyeing was effected with the same dyestuffs under the same conditions but without the addition of the water-soluble linear polyesters, and using the commercial dispersing agents (based on naphthalenesulfonic acid/formaldehyde-condensates) and levelling agents (from fatty acid polyglycol esters, polyglycol and oxethylated alkyl phenols), an unlevel dyeing was obtained which showed big differences as to the color intensity and the shade of the individual wound packages.

EXAMPLE 14

The process was carried out as described in Example 13, but a different linear water-soluble polyester was used which was prepared by polycondensation according to Example 6 from 45 mole % of isophthalic acid
40 mole % of terephthalic acid dimethyl ester
15 mole % of 5-sulfopropoxyisophthalic aciddimethyl ester
60 mole % of diethylene glycol
30 mole % of dipropylene glycol
20 mole % of polyglycol of the molecular weight 400 molecular weight 2,400

The material was dyed during 30 minutes at 130° C yielding a perfectly level brown dyeing.

When in this dyeing process the linear water-soluble polyester was replaced by usual dispersing agents (based on naphthalenesulfonic acid/formaldehyde condensates) and levelling agents (based on fatty acid polyglycol esters, polyglycol and oxethylated alkyl phenols) an unlevel dyeing was obtained.

EXAMPLE 15

The dyeing process was carried out as described in Example 13, but with the use of, other than in the said Example, 0.4% of the disperse dye of the formula IV

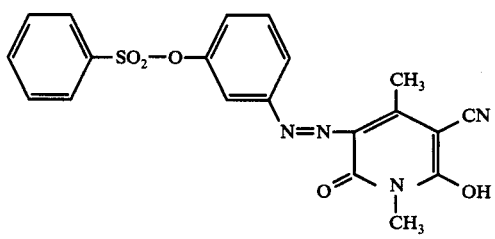

0.32% of the disperse dye of the formula V

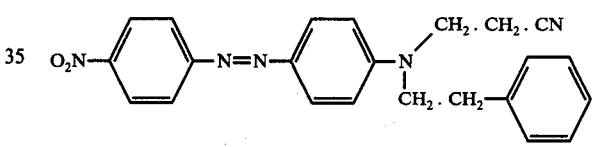

0.26% of the dyestuff of the formula VI

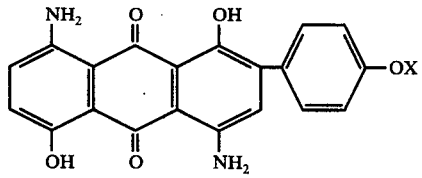

X = 40% — H
60% — CH$_3$.

Dyeing was carried out during 25 minutes at 130° C, reductive after-treatment followed and a level brown dyeing was obtained. When in this dyeing process the linear water-soluble polyester was replaced by commercial dispersing and levelling agents an unlevel dyeing was obtained which showed big differences as to the color intensity and to the shade.

EXAMPLE 16 a. Comparison Example

Wound packages ("muffs") made of texturized polyester fibers was streamed through on a high-speed dyeing machine and at a goods-to-liquor ratio of 1 : 12, by a dyeing liquor of 80° C which consisted of soft water adjusted to pH 5 with acetic acid and contained 0.5 g/l of sodium 2,2'-dinaphthylmethane-6,6-disulfonic acid.

To this liquor were added 1.5% calculated on the weight of the material of the disperse dye of the formula VII

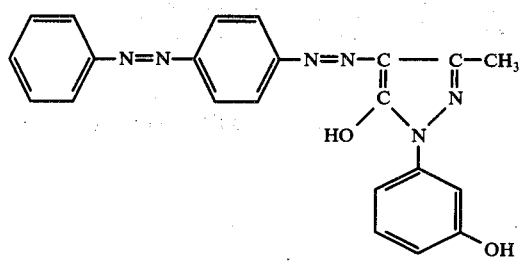

in its liquid, commercial form. Within 40 minutes, the dyebath was heated to 130° C and the dyeing was carried out during 30 minutes at that temperature. The material was rinsed hot and after-treated reductively.

b. Example

When in the dyeing process described above the sodium 2,2'-dinaphthylmethane-6,6-disulfonic acid was replaced by 0.3 g/l of the water-soluble, linear polyester prepared according to Example 7 from 45 mole % of isophthalic acid
40 mole % of dimethylterephthalate
15 mole % of 5-sulfopropoxyisophthalic acid dimethyl ester
60 mole % of diethylene glycol
40 mole % of ethylene glycol
10 mole % of polyglycol of the molecular weight 1,000
molecular weight 2,600 and the process was carried out in exactly the same manner as described above, a level golden-yellow dyeing stable to abrasion was obtained which left no sedimentations on the wound packages.

The dyestuff which could not be used so far for the dyeing of wound packages could now be used without any difficulties.

EXAMPLE 17

The process was carried out as described in Example 16 b but with the use of, other than in the said Example, 2% of the red disperse dye of the formula VIII

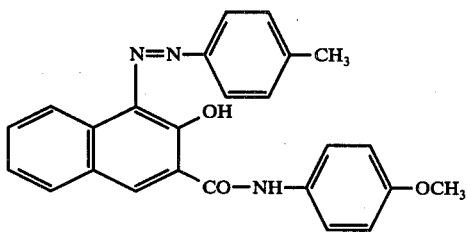

in liquid form and consistency so far unsuitable for the dyeing of wound packages and 0.7 g/l of the water-soluble polyester mentioned in Example 4 b.

A level, brilliant scarlet dyeing stable to abrasion was obtained.

When in the same dyeing process the water-soluble, linear polyester was replaced by a commercial dispersing agent, for example based on the condensation product of formaldehyde and cresol, an unlevel, dull dyeing was obtained which was unstable to abrasion due to dyestuff sedimentations and could not be used.

EXAMPLE 18

The process was carried out as described in Example 13, but the dyestuff of the formula VIII was used.

A brilliant, level scarlet dyeing stable to abrasion was obtained.

When in Example 13 the water-soluble, linear polyester mentioned was replaced by the dispersing agent mentioned in the same Example, an unlevel dyeing was obtained which was unstable to abrasion and was contaminated by filtered-off dyestuff.

We claim:

1. A process for the level dyeing of fiber material made from linear polyesters and from mixtures thereof with natural fibers, with water insoluble disperse dyestuffs according to the exhaust method, which comprises adding to the aqueous dyebath, in addition to the said dyestuffs and pH regulating substances, as levelling agents in an amount of 0.1–5 grams per liter a water soluble or dispersible linear polyester which has the general formula

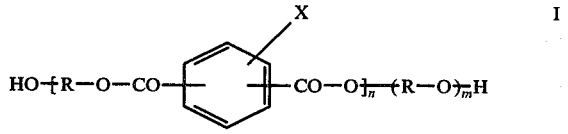

in which $m$ is zero or 1, $n$ is a number such that the average molecular weight of the polyester is 800–5,000, each X, which may be the same or different, is H, $-O-CH_2-CH_2-CH_2-SO_3M$ or $-SO_3M$, in which M is hydrogen or alkali metal or ammonium or substituted ammonium, and each R, which is the same or different, is a diol radical of 2–10 carbons of a saturated or unsaturated aliphatic, cycloaliphatic or aromatic compound and in which the meaning of X is balanced such that 5–30 mole % of all phenylene nuclei in formula I carry a sulfato-containing radical.

2. A process as claimed in claim 1, wherein the amount of the polyester used as the levelling agent in the dyebath is 0.5–2 grams per liter.

3. A process as claimed in claim 1, wherein as the levelling agent a polyester is used in which up to 40% of the chain members have been replaced by hydroxycarboxylic acid units.

4. A process as claimed in claim 1, wherein as the levelling agent a polyester is used in which the dicarboxylic acid component is a benzenedicarboxylic acid.

5. A process as claimed in claim 1, wherein as the levelling agent a polyester is used which contains structural units derived from a mixture of at least two dicarboxylic acids.

6. A process as claimed in claim 1, wherein as the levelling agent a polyester is used in which the diol component is an aliphatic diol containing at least one ether bridges.

7. A process as claimed in claim 6, wherein as the levelling agent a polyester is used in which the diol component is diethylene glycol or a polyethylene glycol.

8. A process as claimed in claim 1, wherein as the levelling agent a polyester is used which contains structural units derived from a mixture of at least two diols.

9. A process as claimed in claim 1, which is a normal high temperature or a high speed process.

10. A process as claimed in claim 1, wherein $n$ is a number such that the average molecular weight of the polyester is 1,000-3,000.

11. A process as claimed in claim 1, wherein the alkali metal atom or substituted ammonium group designated by M is a sodium atom or a triethanol ammonium group respectively.

12. A process as claimed in claim 1, wherein as the levelling agent a water soluble polyester is used in which the phenylene radicals of the general formula are obtained from a mixture comprising 10-20 mole % of 5-sodiumsulfatopropoxy-isophthalic acid dimethyl ester and/or 5-sodiumsulfato-isophthalic acid dimethyl ester, 40-90 mole % of isophthalic acid, ester, anhydride and/or acid halide thereof, and 0-40 mole % of terephthalic acid ester, anhydride and/or acid halide thereof.

13. A process as claimed in claim 12, wherein the terephthalic acid is in the form of the dimethyl ester.

14. A process as claimed in claim 1, wherein as the levelling agent a water soluble polyester is used in which 0-95 mole % of the diol radicals are obtained from diethylene glycol and 5-40 mole % of the diol radicals are obtained from one or more diols having at least two ether bridges.

15. A process as claimed in claim 14, wherein 5-40 mole % of the diol radicals are obtained from at least one polyethylene glycol having a molecular weight of 300-1,000.

16. A process as claimed in claim 1, wherein up to 40% of the benzenedicarboxylic acid structural units are replaced by structural units derived from at least one aliphatic and/or cycloaliphatic dicarboxylic acids of 4-10 carbons.

17. A process as claimed in claim 1, wherein a combination of at least two dyestuffs is used.

* * * * *